United States Patent
Bartholomew et al.

(10) Patent No.: US 7,810,125 B2
(45) Date of Patent: Oct. 5, 2010

(54) METHOD AND SYSTEM FOR A LOW COST WIRELESS TELEPHONE LINK FOR A SET TOP BOX

(75) Inventors: David Bartholomew, West Valley City, UT (US); Scott Smith, Murray, UT (US); Alan Stettler, Murray, UT (US)

(73) Assignee: Phonex Broadband Corporation, Midvale, UT (US)

( * ) Notice: Subject to any disclaimer, the term of this patent is extended or adjusted under 35 U.S.C. 154(b) by 554 days.

(21) Appl. No.: 11/697,123

(22) Filed: Apr. 5, 2007

(65) Prior Publication Data

US 2007/0186256 A1 Aug. 9, 2007

Related U.S. Application Data

(63) Continuation of application No. 09/897,813, filed on Jul. 1, 2001.

(51) Int. Cl.
*H04N 7/18* (2006.01)
*H04N 7/173* (2006.01)
*H04N 7/16* (2006.01)
*G05B 11/01* (2006.01)

(52) U.S. Cl. .......... 725/106; 725/79; 725/151; 340/310.11; 340/310.12; 340/310.16

(58) Field of Classification Search .......... 725/106, 725/79, 151; 340/310.11, 310.12, 310.16
See application file for complete search history.

(56) References Cited

U.S. PATENT DOCUMENTS

| 4,772,870 | A | * | 9/1988 | Reyes | 725/79 |
|---|---|---|---|---|---|
| 5,579,308 | A | | 11/1996 | Humpleman | |
| 5,608,778 | A | | 3/1997 | Partridge, III | |
| 5,630,204 | A | * | 5/1997 | Hylton et al. | 725/81 |
| 5,635,980 | A | | 6/1997 | Lin et al. | |
| 5,666,255 | A | * | 9/1997 | Muelleman | 361/111 |
| 5,671,267 | A | | 9/1997 | August et al. | |
| 5,722,418 | A | | 3/1998 | Bro | |
| 5,745,836 | A | | 4/1998 | Williams | |
| 5,745,850 | A | | 4/1998 | Aldermeshian et al. | |
| 5,777,396 | A | * | 7/1998 | Kikuchi | 307/112 |
| 5,778,116 | A | | 7/1998 | Tomich | |
| 5,805,053 | A | | 9/1998 | Patel et al. | |
| 5,822,324 | A | | 10/1998 | Kostresti et al. | |
| 5,850,340 | A | | 12/1998 | York | |

(Continued)

FOREIGN PATENT DOCUMENTS

WO  WO 99/52220 A1  10/1999

(Continued)

*Primary Examiner*—Christopher Kelley
*Assistant Examiner*—Randy Flynn
(74) *Attorney, Agent, or Firm*—Snell & Wilmer L.L.P.

(57) ABSTRACT

A telephone link for set top box communication between the set top box and a central office is provided. This invention makes use of an AC power line to provide a communication channel between the set top box and the central office. The set top box is configured to include an interface, including coupling and modulation, between the set top box and the AC power line. A base unit, connected to the central office provides another interface configured to facilitate the coupling and modulation of signals between the central office and the AC power line.

18 Claims, 4 Drawing Sheets

U.S. PATENT DOCUMENTS

| | | | |
|---|---|---|---|
| 5,886,732 | A | 3/1999 | Humpleman |
| 5,896,556 | A | 4/1999 | Moreland et al. |
| 5,898,919 | A | 4/1999 | Yuen |
| 5,907,322 | A | 5/1999 | Kelly et al. |
| 5,924,486 | A | 7/1999 | Ehlers et al. |
| 5,940,074 | A | 8/1999 | Britt et al. |
| 5,940,387 | A | 8/1999 | Humpleman |
| 5,945,991 | A | 8/1999 | Britt et al. |
| 5,956,024 | A | 9/1999 | Strickland et al. |
| 5,963,557 | A | 10/1999 | Eng |
| 5,974,461 | A | 10/1999 | Goldman et al. |
| 5,991,085 | A | 11/1999 | Rallison et al. |
| 6,005,563 | A | 12/1999 | White et al. |
| 6,005,861 | A | 12/1999 | Humpleman |
| 6,008,836 | A | 12/1999 | Bruck et al. |
| 6,018,690 | A | 1/2000 | Saito et al. |
| 6,018,765 | A | 1/2000 | Durana et al. |
| 6,023,268 | A | 2/2000 | Britt et al. |
| 6,034,689 | A | 3/2000 | White et al. |
| 6,036,086 | A | 3/2000 | Sizer, II et al. |
| 6,040,829 | A | 3/2000 | Croy et al. |
| 6,044,382 | A | 3/2000 | Martino |
| 6,084,638 | A | 7/2000 | Hare et al. |
| 6,091,025 | A | 7/2000 | Cotter et al. |
| 6,121,998 | A | 9/2000 | Voois et al. |
| 6,124,882 | A | 9/2000 | Voois et al. |
| 6,125,172 | A | 9/2000 | August et al. |
| 6,138,173 | A | 10/2000 | Hisano |
| 6,150,942 | A | 11/2000 | O'Brien |
| 6,151,480 | A * | 11/2000 | Fischer et al. ............ 725/81 |
| 6,151,559 | A | 11/2000 | Williams |
| 6,188,397 | B1 | 2/2001 | Humpleman |
| 6,212,262 | B1 | 4/2001 | Kamel |
| 6,215,483 | B1 | 4/2001 | Zigmond |
| 6,216,956 | B1 | 4/2001 | Ehlers et al. |
| 6,219,042 | B1 | 4/2001 | Anderson et al. |
| 6,223,213 | B1 | 4/2001 | Cleron et al. |
| 6,227,974 | B1 | 5/2001 | Eilat et al. |
| 6,230,319 | B1 | 5/2001 | Britt et al. |
| 6,237,022 | B1 | 5/2001 | Bruck et al. |
| 6,240,183 | B1 | 5/2001 | Marchant |
| 6,252,952 | B1 | 6/2001 | Kung et al. |

FOREIGN PATENT DOCUMENTS

| | | | |
|---|---|---|---|
| WO | WO 01/28241 | A1 | 4/2001 |
| WO | WO 0182581 | A1 * | 11/2001 |

* cited by examiner

METHOD AND SYSTEM FOR A LOW COST WIRELESS TELEPHONE LINK FOR A SET TOP BOX

CROSS-REFERENCE TO RELATED APPLICATIONS

This application is a continuation of and claims benefit of priority to U.S. Nonprovisional patent application Ser. No. 09/897,813 filed Jul. 1, 2001, which is herein incorporated by reference in its entirety.

BACKGROUND OF THE INVENTION

1. Field of the Invention

This invention relates to set top box communication systems. More particularly, this invention relates to AC power line communication systems adapted for use between a set top box and a telephone line.

2. Description of the Related Art

A variety of set top box communication systems have been proposed. However, typically these systems require dedicated telephone wiring or communication cabling between the set top box and the telephone communication equipment. Therefore, such systems fail to provide set top box communication in areas or installations where dedicated telephone lines are either unavailable or prohibitively expensive.

For general background material the reader is directed to the following U.S. patents each of which is incorporated in its entirety for the material contained therein. U.S. Pat. No. 5,579,308 describes a home network architecture that has an internal digital network for interconnecting devices in the home.

U.S. Pat. No. 5,630,204 describes a system and method for providing interactive multimedia services to subscriber premises utilizing wireless and power line distribution within the subscriber premise.

U.S. Pat. No. 5,635,980 describes a broadband customer premises equipment interface device that interfaces with conventional telephones, screen phones, and broadband data and video devices.

U.S. Pat. No. 5,745,836 describes an undesirable energy suppression system in a contention based communications network having a shared communication path between a plurality of remote points and a headend in a simplex network or a bi-directional network.

U.S. Pat. No. 5,778,116 describes an apparatus for distributing and controlling distribution of externally and locally generated communications signals to and between a plurality of subscribers.

U.S. Pat. No. 5,850,340 describes a system which includes a remote keyboard and a remote pointer to control a personal computer.

U.S. Pat. No. 5,886,732 describes a set-top electronics and network interface unit arrangement that is connected to an internal digital network interconnecting devices in the home.

U.S. Pat. No. 5,896,556 describes an apparatus that is adapted to provide a telephone line connection over a coax cable distribution system.

U.S. Pat. No. 5,898,919 describes a system for communicating information from a television viewer to a central site that includes a remote control unit for sending command signals from the viewer to a television or video cassette recorder.

U.S. Pat. No. 5,924,486 describes an indoor environmental condition control and energy management system that includes a plurality of inputs.

U.S. Pat. No. 5,940,074 describes a World Wide Web browser software that is implemented in a processing system housed in a set-top box connected to a television and communicating over a wide-area network with one or more servers.

U.S. Pat. No. 5,940,387 describes a home network architecture that has an internal digital network interconnecting devices in the home.

U.S. Pat. No. 5,945,991 describes web browser software implemented in a set-top box as part of a client system communicating over the Internet with one or more servers that allows a user to adjust the position of a screen image displayed on a monitor through World-Wide Web pages displayed on the monitor.

U.S. Pat. No. 5,963,557 describes a method and system for enabling point-to-point and multicast communication in a network using three types of communications channels, namely, one or more upstream payload channels, one or more upstream control channels and one or more downstream channels.

U.S. Pat. No. 5,974,461 describes a method and computer program product for automatically regenerating information at a client system without user intervention in the event of power disruption or disruption in communication between the client system and a server.

U.S. Pat. No. 5,991,085 describes a visual display device that is provided for delivering a generated image, preferably combinable with environment light, to the eye of a user.

U.S. Pat. No. 6,005,563 describes web browser software that is implemented in a processing system housed in a set-top box connected to a television and communicating over a wide-area network with one or more servers.

U.S. Pat. No. 6,005,861 describes a home network architecture that has an internal digital network interconnecting devices in the home.

U.S. Pat. No. 6,008,836 describes web browser software implemented in a set-top box as part of a client system communicating over the Internet with one or more servers that allows a user to adjust the picture quality of a monitor through World-Wide Web pages displayed on the monitor.

U.S. Pat. No. 6,018,690 describes a power supply control method, system and computer program patent for use in supplying power to a plurality of electric apparatuses connected to a power line having a predetermined maximum consumable power, where power consumption of the power line is measured as a first power consumption.

U.S. Pat. No. 6,018,765 describes a data server that implements a video-on-demand system by providing multiple channels of video and audio on which video programs can play simultaneously and independently.

U.S. Pat. No. 6,023,268 describes World Wide Web browser software that is implemented in a processing system housed in a set-top box connected to a television and communicating over a wide-area network with one or more servers.

U.S. Pat. No. 6,034,689 describes browser software that is implemented in a set-top box as part of a client system communicating over the Internet with one or more servers that allows a user to navigate using a remote control through World-Wide Wide Web pages in which a plurality of hypertext anchors are displayed on a television.

U.S. Pat. No. 6,040,829 describes a hand-held device and system for monitoring and controlling electronic devices.

SUMMARY OF THE INVENTION

It is desirable to provide a method and system for a wireless telephone communication channel for use with set top boxes. It is particularly desirable to provide such a method and system, which makes use of the preexisting AC power lines as the communication channel.

Accordingly, it is an object of this invention to provide a method and system for a wireless telephone communication channel for use with set top boxes that employs the AC power line to connect the set top box to the telephone line without requiring the use or installation of dedicated telephone wires.

Another object of this invention is to provide a method and system for a wireless telephone communication channel for use with set top boxes that provides easy plug-and-play installation thereby reducing the time required for installers to connect the telephone line to the set top box.

A further object of this invention is to provide a method and system for a wireless telephone communication channel for use with set top boxes that is designed to work with existing standard commercially available set top boxes.

A still further object of this invention is to provide a method and system for a wireless telephone communication channel for use with set top boxes that is a low cost stand-alone system.

It is another object of this invention to provide a method and system for a wireless telephone communication channel for use with set top boxes that can be provided as an embedded digital jack/modem system.

It is a still further object of this invention to provide a method and system for a wireless telephone communication channel for use with set top boxes that can be provided embedded into a standard set top box.

Additional objects, advantages and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiments of this invention, simply by way of illustration of the modes presently considered by the inventors to be best suited to carry out this invention. As it will be realized, this invention is capable of other different embodiments, and its several details, and specific electronic circuits, are capable of modification in various aspects without departing from the concept of this invention. Accordingly, the drawings and descriptions should be regarded as illustrative in nature and not as restrictive.

BRIEF DESCRIPTION OF THE DRAWINGS

The accompanying drawings incorporated in and forming a part of the specification, illustrate a preferred embodiment of the present invention. Some, although not all, alternative embodiments are described in the following description. In the drawings.

Reference will now be made in detail to the present preferred embodiments of the invention, examples of which are illustrated in the accompanying drawings.

DETAILED DESCRIPTION

This invention is a wireless telephone communication link system for use with a set top box. This invention permits the connection between a standard set top box and the telephone line without requiring the installation of dedicated telephone wires. In its present preferred embodiment, this invention makes use of pre-existing AC power lines in the communication channel. Moreover, this invention provides easy plug-n-play installation to minimize the time required for installation personnel to connect the telephone line to the set top box.

Figure 1:
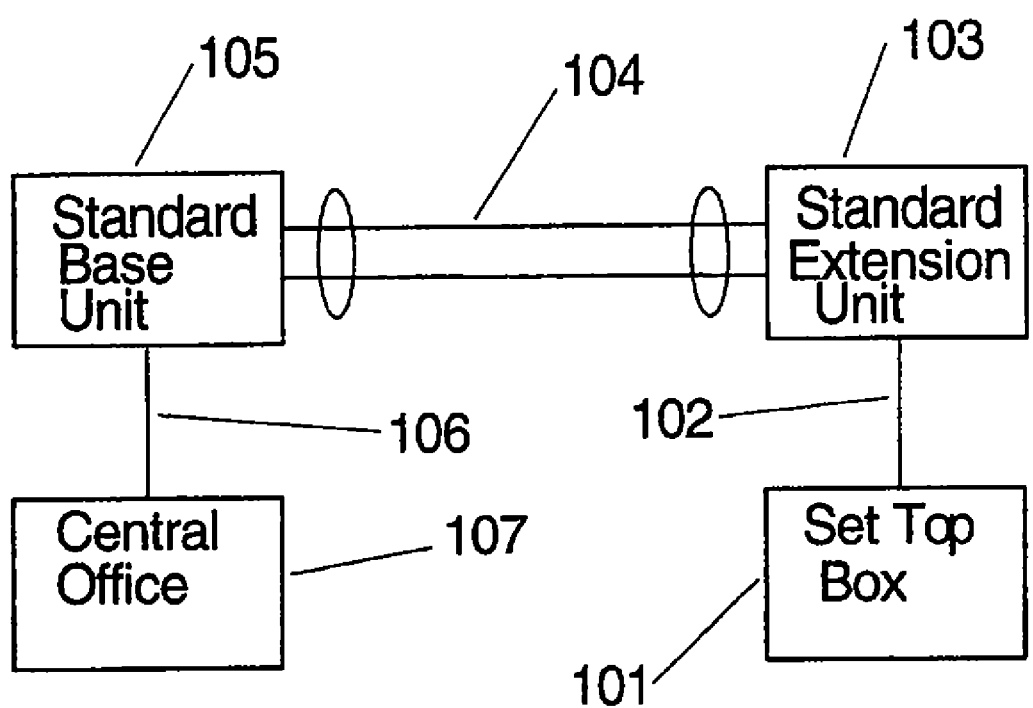
FIG. 1 is a top-level system block diagram showing the major sections of a first preferred embodiment of this invention.

FIG. 1 shows a top-level system block diagram of the major sections of a first preferred embodiment of this invention. The set top box 101 is connected, typically and preferably by a standard telephone cable 102, to a standard power line extension unit 103. The standard power line extension unit 103 converts the telephone signal from the set top box 101 to a modulated power line compatible signal and couples the converted signal onto the AC power line. Typically and preferably the connection between the standard extension unit 103 and the AC power line is made through a standard wall plug and socket. Also connected to the AC power line is a standard base unit 105. Connected electrically, typically via a standard electrical cable 106 to the central office 107, the standard base unit 105 provides the interface, demodulation and coupling of the signals received from the set top box 101 for receipt and processing by the central office 107. The standard base unit 105 also receives control signals from the central office 107, modulates and couples the modulated control signals for transmission across the AC power line 104, where the control signals are received, decoupled and demodulated by the standard extension unit 103. Which in turn provides the control signals to the set top box 101. As can be seen by the reader, this embodiment of the invention provides the means for connecting a set top box 101 to a central office 107 across an AC power line 104 without requiring continuous dedicated telephone or other wiring.

Figure 2:
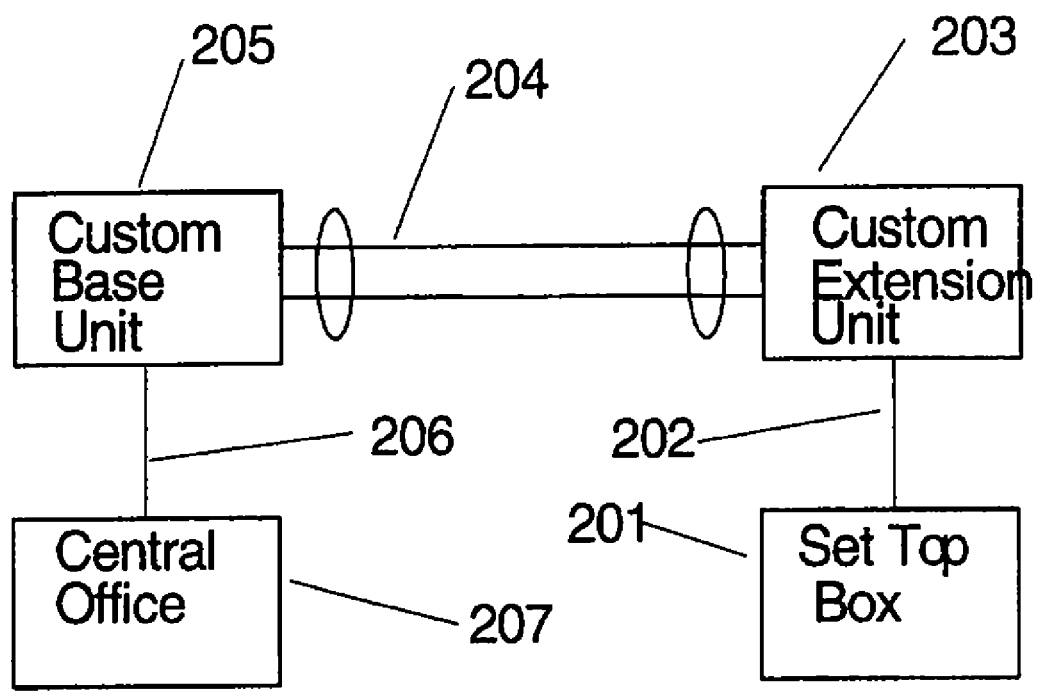
FIG. 2 is a top-level system block diagram showing the major sections of a second preferred embodiment of this invention.

FIG. 2 shows a top-level system block diagram of the major sections of a second preferred embodiment of this invention. In this embodiment, the set top box 201 is connected 202 electrically, preferably via an RJ-11 connector, to a custom extension unit 203, which in turn couples and decouples signals to and from an AC power line 204. Also connected to the AC power line 204 is a custom base unit 205, which decouples and couples signals to and from the central office 207, which is preferably electrically connected, via an RJ-11 connector, to the custom base unit 205. In alternative embodiments, the connection 206 between the central office 207 and the custom base unit 205 may be RF or optical or the like. Similarly, in alternative embodiments the connection 202 between the set top box 201 and the custom extension unit 203 may be an RF or optical or the like channel. The custom extension unit 203 of this embodiment is similar to the standard extension unit 103 and the custom base unit 205 is generally similar to the standard base unit 105, with certain costly but generally unnecessary circuitry removed. The removed circuitry includes ringer and caller identification circuitry. The custom extension unit 203 is designed to be capable of initiating a call over the wireless AC power line 204 data path, although typically it does not receive an incoming call from the custom base unit 205. The custom base unit 205 is designed without the capability of initiating a call to the custom extension unit 203. By removing the ability of the custom base unit 205 to initiate a call a level of inherent security is provided. In the preferred embodiment, additional security, through encryption is provided to enhance privacy, reliability and performance. The custom base unit 205 is also adapted to terminate a wireless call from the custom extension unit 203 if an off-hook condition from another telephone device on the phone line is detected. The custom base unit 205 is also designed to not go off-hook from a request from the custom extension unit 203 if the custom base unit 205 detects another telephone device is on the line and already off-hook. The preferred data communication between the custom extension unit 203 and the custom base unit 205 is full duplex, operating at a minimum of 2400 baud modem data bandwidth. The present telephone line connections of the custom base unit 205 provides telephone line isolation of 68,600 ohms and 2500 VDC isolation to ground as required by FCC part 68 regulations. Signal input connections to the custom base unit 205 presents 42 volts+/−5 volts DC open circuit with an output impedance of 1000 ohms+/−5% with a minimum current limitation of 30 mA.

Figure 3:
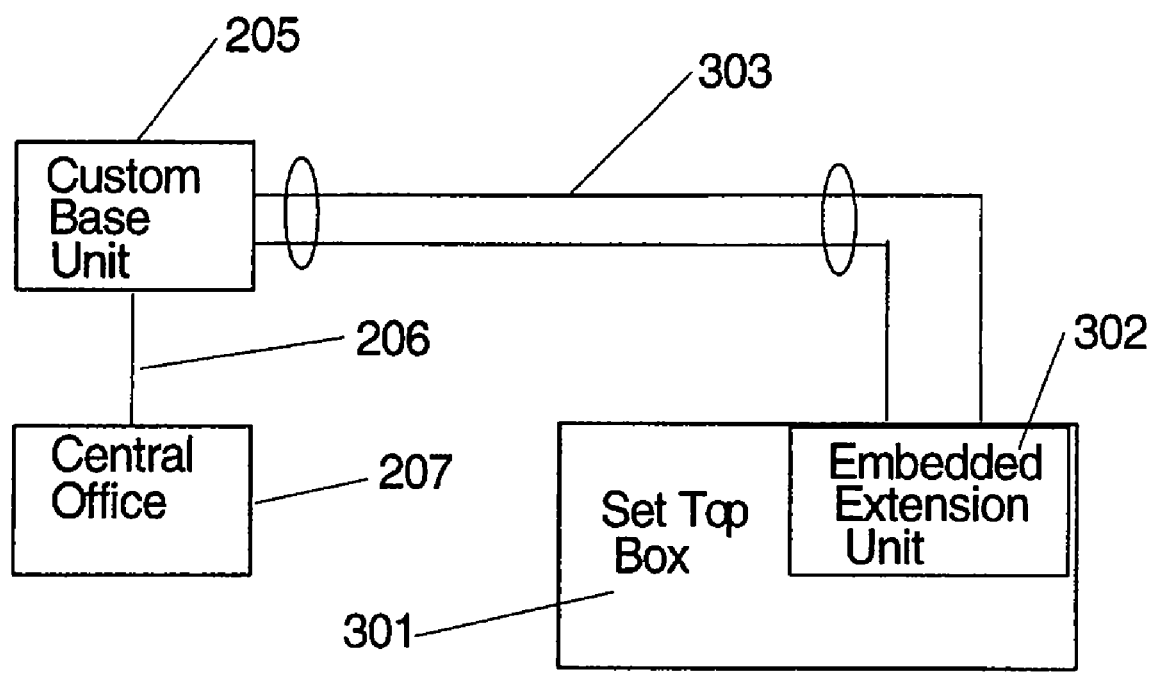
FIG. 3 is a top-level system block diagram showing the major sections of a third preferred embodiment of this invention.
Figure 4:
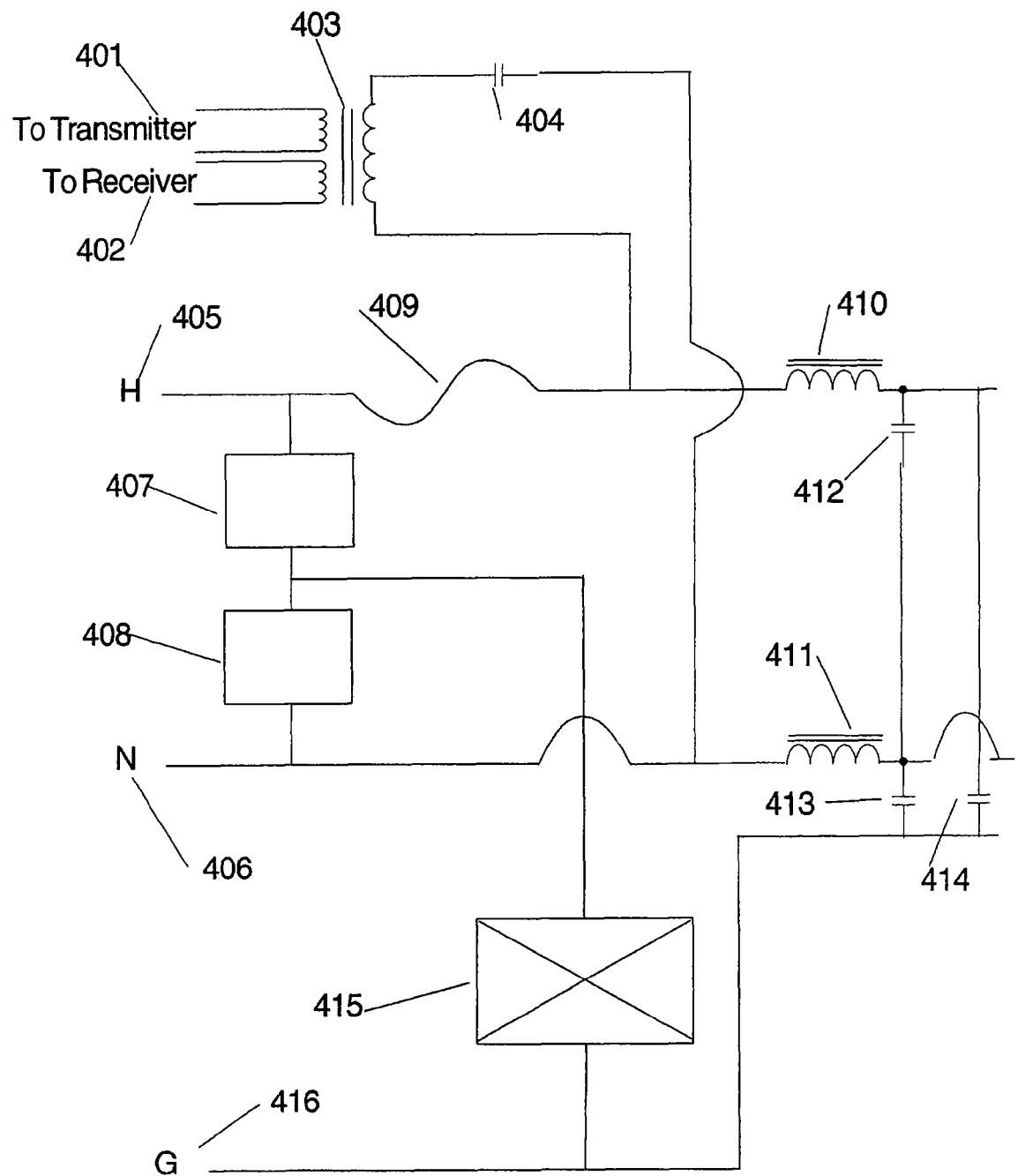
FIG. 4 is a detailed schematic of the preferred power supply modification circuit of this invention.

FIG. 3 shows a top-level system block diagram of the major sections of a third preferred embodiment of this invention. This embodiment incorporates an embedded extension unit 302 in a modified set top box 301. This embedded extension unit 302 connects to the AC power line 303 modulating and coupling set top box 301 initiated communication between the embedded extension unit 302 and the custom base unit 205. The custom base unit 205 communicates 206 with a central office 207 as described above with regard to FIG. 2. This embodiment of the invention employs a new power supply design as shown in FIG. 4. Also, included in the modified set top box 301 are a power line carrier transmitter and a power line carrier receiver. The preferred power line carrier transmitter preferably includes a frequency shift key (FSK) oscillator, a buffer, a power line RF power amplifier and filters. The preferred power line carrier receiver preferably consists of an FSK receiver, filters and a data slicer. A control signal from the set top box 301 turns the transmitter on and off. Data received and transmitted between the embedded extension unit 302 and the set top box 301 is preferably communicated asynchronously, with an internal processor handling the data directly. A pre-processor is preferably employed within the modified set top. box 301 (or in an alternative embodiment in the embedded extension unit 302) to handle the bus speed, to keep the power line carrier link, to interface to a bus, provide interrupts and to provide error detection/correction.

FIG. 4 shows a detailed schematic of the preferred power supply modification circuit of this invention. This preferred power supply provides a connection 401 to a transmitter and a connection 402 to a receiver. A 3:1:1 Balun transformer 403 is used to couple the transformer and receiver connections 401, 402 to the power supply. A 0.01 µF 250V, X-Y capacitor 404 is electrically connected to the Balun transformer 403 and to the neutral 406 line of the power supply. The other connection of the Balun transformer 403 is electrically connected to a fuse 409 through which the voltage 405 is supplied. Two 83 µH inductors 410, 411 are connected to the fuse 409 and to the neutral line 406 respectively. Decoupling capacitors 412, 413, 414 are provided between the voltage 405, the neutral 406 and the ground 416 lines. These preferred decoupling capacitors 412, 413, 414 are selected to be 0.1 µF or 0.22 µF. Surge suppressant devices 407, 408 and 415 are provided between the ground line 416 and the neutral line 406 and the voltage line 405.

The previously described preferred embodiments of the invention are to be considered in all respects only as illustrative and not as restrictive. Although the embodiments shown and described herein identify specific components, circuitry and connections, the invention is not limited thereto. The scope of this invention is indicated by the appended claims rather than by the foregoing description. All devices, which come directly within the claims or within the meaning and range of equivalency of the claims, are to be embraced as being within the scope of protection legally and equitably afforded to this invention.

We claim:

1. A wireless telephone communication system for a set top box, comprising:
    (A) a base unit connected to an AC power line for the transmission and receipt of control and data signals; and
    (B) a set top box configured to receive AC power, and control and data signals from the AC power line at an AC power line input; wherein the set top box further comprises
    a power input comprising a hot power input and a neutral power input, and configured to be electrically connected to an AC power line and to provide power and communication signals over the AC power line;
    a first inductor and a second inductor, each comprising a first end and a second end;
    a first capacitor connected between the second end of the first inductor and the second end of the second inductor, wherein no capacitor is connected directly between the first end of the first inductor and the first end of the second inductor;
    a power output comprising a hot power output and a neutral power output, and configured to provide power to a set top box power supply;
    a transformer comprising a first transformer connection point and a second transformer connection point, and configured to pass signals between the power input and a signal port comprising a transmit port and a receive port; and
    a second capacitor comprising a first end and a second end,
    wherein the first transformer connection point is electrically connected to a first end of the second capacitor,
    wherein the second end of the second capacitor is connected to the first end of the second inductor,
    wherein the second transformer connection point is connected to the first end of the first inductor,
    wherein the hot power input is electrically connected to the first end of the first inductor, and wherein the hot power output is electrically connected to the second end of the first inductor, and
    wherein the neutral power input is electrically connected to the first end of the second inductor, and wherein the neutral power output is electrically connected to the second end of the second inductor.

2. The system of claim 1, wherein the set top box is further configured to send and receive signals through the transformer.

3. The system of claim 1 wherein the transformer is a 3:1:1 Balun transformer.

4. A set top box front end comprising:
a power input comprising a hot power input and a neutral power input, and configured to be electrically connected to an AC power line and to provide power and communication signals over the AC power line;
a first inductor and a second inductor, each comprising a first end and a second end;
a first capacitor connected between the second end of the first inductor and the second end of the second inductor, wherein no capacitor is connected directly between the first end of the first inductor and the first end of the second inductor;
a power output comprising a hot power output and a neutral power output, and configured to provide power to a set top box power supply;
a transformer comprising a first transformer connection point and a second transformer connection point, and configured to pass signals between the power input and a signal port comprising a transmit port and a receive port; and
a second capacitor comprising a first end and a second end, wherein the first transformer connection point is electrically connected to a first end of the second capacitor,
wherein the second end of the second capacitor is connected to the first end of the second inductor,
wherein the second transformer connection point is connected to the first end of the first inductor,
wherein said hot power input is electrically connected to the first end of the first inductor, and wherein the hot power output is electrically connected to the second end of the first inductor, and
wherein the neutral power input is electrically connected to the first end of the second inductor, and wherein the neutral power output is electrically connected to the second end of the second inductor.

5. The set top box front end of claim 4 wherein the transformer is a 3:1:1 Balun transformer.

6. A wireless telephone communication system for a set top box, comprising:
(A) a base unit, wherein the base unit is connected to a standard telephone cable and to an AC power line, and wherein the base unit is configured to transmit and receive control and data signals over both the standard telephone cable and the AC power line;
(B) an extension unit connected to the AC power line to transmit and receive control and data signals to and from the base unit, wherein the extension unit is embedded within the set top box, and wherein the embedded extension unit is controlled by the set top box;
(C) a central office device connected to the base unit,
(D) a power supply comprising:
a hot line coupled to the transformer comprising a hot power input;
a neutral line coupled to the transformer comprising a neutral line input, the hot power input and the neutral line input configured to be electrically connected to the AC power and to transmit and receive control and data signals;
a signal port comprising a transmit port and a receive port;
a transformer including a first transformer connection point and a second transformer connection point, the transformer configured to pass signals between the hot power input and the signal port;
a first capacitor including a first end and a second end, the first end of the first capacitor coupled to the first transformer connection point, and the second end of the first capacitor coupled to the neutral line;
a first inductor including a first end and a second end, the first end of the first inductor coupled to the hot line and the second transformer connection point;
a second inductor including a first end and a second end, the first end of the second inductor coupled to the neutral line input;
a second capacitor coupled between the hot line and the neutral line on the second end of the first inductor and the second end of the second inductor;
a ground line;
a third capacitor coupled between the neutral line and the ground line on the second end of the second inductor; and
a fourth capacitor coupled between the hot line and the ground line on the second end of the first inductor.

7. The system of claim 6, wherein the transformer comprises at least one of a connector for coupling the power supply to a transmitter and a connector for coupling the power supply to a receiver.

8. The system of claim 6, wherein the first transformer is a coupling transformer.

9. The system of claim 8, wherein the coupling transformer is a 3:1:1 Balun transformer.

10. The system of claim 6, wherein the first capacitor is an X-Y capacitor.

11. The system of claim 6, wherein the first capacitor is an 0.01 µF, 250 volt, X-Y capacitor.

12. The system of claim 6, wherein at least one of the first inductor and the second inductor is an 83 µH inductor.

13. The system of claim 6, wherein at least one of the second capacitor, the third capacitor, and the fourth capacitor is a decoupling capacitor.

14. The system of claim 6, wherein each of the second capacitor, the third capacitor, and the fourth capacitor is a decoupling capacitor.

15. The system of claim 6, wherein at least one of the second capacitor, the third capacitor, and the fourth capacitor is a 0.1 µF capacitor.

16. The system of claim 6, wherein at least one of the second capacitor, the third capacitor, and the fourth capacitor is a 0.22 µF capacitor.

17. The system of claim 6, wherein each of the second capacitor, the third capacitor, and the fourth capacitor is a 0.1 µF capacitor.

18. The system of claim 6, wherein each of the second capacitor, the third capacitor, and the fourth capacitor is a 0.22 F capacitor.

* * * * *